E. C. SENDELBACH.
RESILIENT WHEEL.
APPLICATION FILED DEC. 9, 1915.

1,187,107.

Patented June 13, 1916.

Inventor,
Edward C. Sendelbach.
By Bakewell Church Attys.

UNITED STATES PATENT OFFICE.

EDWARD C. SENDELBACH, OF PIQUA, OHIO.

RESILIENT WHEEL.

1,187,107.　　　　　Specification of Letters Patent.　　Patented June 13, 1916.

Application filed December 9, 1915. Serial No. 65,982.

*To all whom it may concern:*

Be it known that I, EDWARD C. SENDELBACH, a citizen of the United States, residing at Piqua, Ohio, have invented a certain new and useful Improvement in Resilient Wheels, of which the following is a full, clear, and exact description, such as will enable others skilled in the art to which it appertains to make and use the same.

This invention relates to wheels and particularly to vehicle wheels of the type in which one or more springs are arranged between the hub and rim portions of the wheel for absorbing the shocks and jars that the rim portion receives when in service.

The object of my invention is to provide a wheel of the type referred to which is constructed in such a manner that there is very little liability of the springs becoming broken in service.

Figure 1:
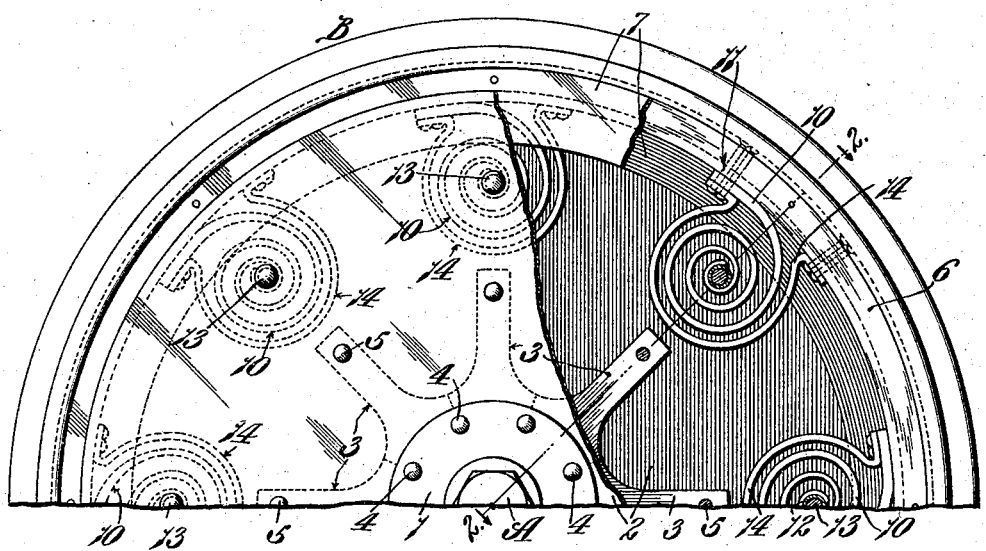
Figure 2:
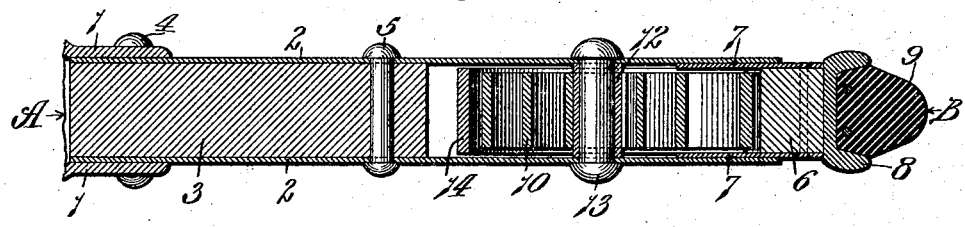
Figure 3:
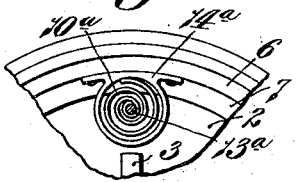

Figure 1 of the drawings is a side elevational view of a portion of a vehicle wheel constructed in accordance with my invention, part of the outside covering of the wheel being broken away; Fig. 2 is an enlarged sectional view taken on the line 2—2 of Fig. 1; and Fig. 3 is a fragmentary elevational view, illustrating a slight modification of my invention.

Referring to the drawings, which illustrate the preferred form of my invention, A designates the hub portion of the wheel and B designates the rim portion. The hub portion A comprises a pair of hub plates 1, a sheet metal disk 2 arranged inside of each of said plates and a plurality of comparatively short spokes 3 that are arranged between the disks 2, all of said parts being held rigidly together by means of fastening devices 4 that pass through the hub plates, disks and spokes, and devices 5 that pass through the disks and the spokes adjacent the outer end of said spokes.

The rim portion B comprises a felly 6 that carries a pair of inwardly-extending side plates or rings 7, a metallic rim 8, and a rubber tire 9 mounted on said rim, the rings 7 on the felly being telescoped into or arranged in sliding engagement with the disks 2.

The means for connecting the hub and rim portions of the wheel together in such a manner that one of said portions can move slightly in vertical and circumferential directions with respect to the other portion consists of a plurality of spiral springs 10, said springs being preferably tapered in thickness from end to end, the thicker or outer end of each of said springs being rigidly connected to the felly 6 by means of suitable fastening devices 11, and the inner end being connected to a sleeve or bushing 12 that is mounted on a transversely-disposed bolt or rod 13 that is secured in the disks 2.

When the wheel is in service on a vehicle, for instance, an automobile, and the hub portion A is driven, the power will be transmitted to the rim portion through the springs 10, and said rim portion will revolve with the hub portion, the telescoping disks 2 and rings 7 preventing any lateral movement of the rim portion with respect to the hub portion and the springs 10 allowing the rim portion to yield or give vertically with respect to the hub portion when the wheel is running over rough places in the road.

One serious objection to resilient wheels of the general type referred to, namely, wheels in which the hub and rim portions are connected together by means of spiral springs, is the fact that in the usual constructions, the springs are apt to be abnormally stretched or elongated when a severe shock is encountered, this elongation frequently breaking the springs or else changing the shape of same to such an extent that the rim portion of the wheel is not true with respect to the hub portion. In order to overcome this objection and prevent the springs 10 from being subjected to any abnormal strains or shocks that would be liable to break the same, I have provided for each of said springs a guard or stirrup 14 of comparatively stiff metal that embraces the spring and whose ends are rigidly connected to the felly 6, as shown clearly in Fig. 1. This stirrup 14 lies comparatively close to the outer coil of the spring 10, and whenever the hub portion A is caused to move circumferentially with respect to the rim portion a distance greater than that normally moved in service, such as when starting the vehicle, the stirrup will engage the outer coil of the spring 10 and cause the portion of the spring engaged to compress toward the bolt 13, and thus gradually checking the movement of said hub and preventing said spring from breaking or stretching into such a position as to lose its original shape.

When a severe vertical shock is encountered, such as when the wheel is passing over an obstruction in the road, the inner curved portion of the stirrup will engage the spring 10 and compress the same toward the bolt 13, and thus cushion the shock and check the spring from further movement tending to elongate the same. In other words, the stirrup 14 and the portion of the felly between the ends of said stirrup form a pocket that confines the spring 10 and restricts the stretching or elongating movement of same, while permitting the same to compress and change its original shape whenever the rim portion of the wheel is caused to move vertically or circumferentially with respect to the hub portion. Thus it will be seen that when a shock is encountered sufficient to abnormally elongate or stretch the springs, were they free to be elongated, the stirrups then come into play and compress the springs between the point of contact and the bolt 13, and hold the spring confined in such a manner that it cannot become broken or stretched out of shape. Of course, it is obvious that in running over comparatively smooth roads the stirrups 14 never come into play, their function being to protect the springs when abnormal road conditions are encountered.

The spokes 3 extend outwardly from the hub portion and are arranged in longitudinal alinement with the stirrups so that the outer ends of the spokes will terminate a short distance inwardly from the stirrups 14. By constructing the spokes in this manner, the disks 2 are materially strengthened and the outer ends of said spokes also act as bumpers which coöperate with the stirrups 14 whenever necessary. The stirrups 14 are of a width substantially equal to the distance between the rings 7, and consequently, stiffen said rings and aid in preventing lateral movement of the rim portion with the respect to the hub portion.

From the foregoing it will be seen that I have devised a resilient wheel that is constructed in such a manner that the resilient connections between the hub and rim portions of the wheel are protected against breakage in service. The stirrups surrounding each spring limit the action of the springs so that they cannot become abnormally elongated or stretched and also coöperate with said springs to transmit movement from one portion of the wheel to the other. Furthermore, said stirrups, being of a width substantially equal to the distance between the side disks of the wheel, will reinforce said disks and prevent one portion of the wheel from moving laterally with relation to the other. The coöperating disks 2 and rings 7 entirely inclose the springs and stirrups, and thus prevent dirt or other foreign matter from entering the interior of the wheel, and also present a neat and ornamental appearance. Owing to the few simple rugged parts of which my improved wheel is composed, it can be produced at a low cost of manufacture and is not liable to get out of order easily.

In Fig. 3 I have illustrated a construction in which the stirrup $14^a$ entirely encircles the spring $10^a$, said spring being connected to the bolt $13^a$ and having its outer end free and bearing against the inner face of the stirrup.

It is obvious that other modifications and combinations of the various elements herein shown and described can be made without departing from the spirit of my invention.

Having thus described my invention, what I claim, and desire to secure by Letters Patent, is:

In a vehicle wheel, a hub portion comprising spokes and a pair of disk-shaped side plates embracing said spokes and terminating beyond the outer ends of same, a rim portion comprising a felly and a pair of side plates on said felly that telescope between the side plates on said hub portion, stirrups on said felly arranged in radial alinement with said spokes so that the ends of the spokes will strike squarely against the inner ends of said stirrups under certain conditions, and spiral springs in said stirrups connected at their outer ends to said felly and having their inner ends connected to the side plates of said hub portion at points in radial alinement with said spokes.

In testimony whereof I hereunto affix my signature in the presence of two witnesses, this 3 day of December, 1915.

EDWARD C. SENDELBACH.

Witnesses:
 F. C. FULLER,
 F. L. MARSHALL.

Copies of this patent may be obtained for five cents each, by addressing the "Commissioner of Patents, Washington, D. C."